(12) United States Patent
Nakaya et al.

(10) Patent No.: US 6,538,161 B2
(45) Date of Patent: Mar. 25, 2003

(54) FLUORESCENT SUBSTANCES

(75) Inventors: Tadao Nakaya, Tokyo (JP); Takao Yamauchi, Yokohama (JP); Akio Tajima, Ebina (JP); Hidemasa Mouri, Yokohama (JP)

(73) Assignee: Taiho Industries Co., Ltd., Tokyo (JP)

( * ) Notice: Subject to any disclaimer, the term of this patent is extended or adjusted under 35 U.S.C. 154(b) by 0 days.

(21) Appl. No.: 09/958,879

(22) PCT Filed: Feb. 19, 2001

(86) PCT No.: PCT/JP01/01162
§ 371 (c)(1),
(2), (4) Date: Jan. 10, 2002

(87) PCT Pub. No.: WO01/60942
PCT Pub. Date: Aug. 23, 2001

(65) Prior Publication Data
US 2002/0156319 A1 Oct. 24, 2002

(30) Foreign Application Priority Data
Feb. 18, 2000 (JP) .......................................... 2000-41723

(51) Int. Cl.⁷ ..................... C07C 205/00; C07C 207/00; C07C 255/00; C07C 229/00; C07C 69/76
(52) U.S. Cl. ....................... 568/424; 568/425; 558/388; 560/19; 560/100
(58) Field of Search ................................ 568/424, 425; 560/19, 100; 558/388

(56) References Cited

U.S. PATENT DOCUMENTS 3,385,897 A * 5/1968 Vanderwerff et al. ....... 260/599
5,955,635 A * 9/1999 Cabri .......................... 568/314

FOREIGN PATENT DOCUMENTS

| DE | 19813402 | * | 9/1999 |
| JP | 60132978 | * | 7/1985 |
| JP | 61018740 | * | 1/1986 |

OTHER PUBLICATIONS

Deussen et al, JACS, 118(29), 6841–6852 (1996).*
Hendrickx et al, Acc.Chem.Res., 31(10), 675–683 (1998).*
Masahide et al, Bull.Chem.Soc.Jpn., 71(7), 1655–1660 (1998).*

* cited by examiner

*Primary Examiner*—Deborah D. Carr
*Assistant Examiner*—Sikarl A. Witherspoon
(74) *Attorney, Agent, or Firm*—Arent Fox Kintner Plotkin & Kahn, PLLC

(57) ABSTRACT

The objective of this invention is to provide fluorescent compounds comprising a naphthalene skeleton, an electron donating group substituted at the 2- or 1-position of the naphthalene skeleton, and an electron attractive group substituted at the 6- or 4-position of the skeleton. The fluorescent compound of this invention is capable of emitting visible light having a desired color by choosing an appropriate combination of the electron donating group A, which has an electron-pushing function, and the electron attractive group B, which has an electron-pulling function.

6 Claims, 10 Drawing Sheets

PL spectrum of Dye sample No.3
Excitation: He-Cd laser 8mW

PL spectrum of Dye sample No.5
Excitation: He-Cd laser 8mW

FLUORESCENT SUBSTANCES

This application is a 371 of PCT/JP01/01162, filed Feb. 19, 2001, published in WO 01/60942 on Aug. 23, 2001.

TECHNICAL FIELD

The present invention relates to fluorescent compounds, more particularly, to fluorescent compounds that emit light of various colors when such energy as electric energy or electromagnetic energy is applied thereto, and that can be used for electroluminescent elements.

BACKGROUND ART

Such a color of visible light as blue, yellow green or red, emitted by an electroluminescent element, which we will call "EL element" hereafter, can easily be controlled through an appropriate choice of compounds used for the fluorescent material. Very many compounds have been developed for the fluorescent materials.

These compounds include derivatives of aluminum-8-hydroxyquinolinolate complexes, those of oxadiazoles, those of triazoles, those of di(styryl)arylenes, those of cumarines, those of bis(styryl)amines, etc.

The use of these compounds, however, has involved several problems. One of them is that the production cost is high, because the raw materials are not commonly marketed ones. Another is that their production requires a process of many steps and special reaction conditions. Besides, their yields are small. Therefore only a few of them have been put to practical use. Even for the compounds actually in practical use, a further reduction in production cost is desired.

Also, technically, of the compounds that emit blue light, yellow green light, or red light have been especially desired those that emit light of a clear red. In detail, red light having been used in conventional CRT displays had a wavelength of 625 nm at the maximum. In order to make the red light clearer, it is necessary and desired to employ compounds that emit a light having strong sharp peaks in the wavelength range of 630–700 nm.

Further, from the industrial viewpoint, is also desired the development of such fluorescent materials as can emit light of various and desired wavelengths only through chemical modifications to compounds belonging to the same category. Specifically, intended is the development of fluorescent compounds of which wavelengths of the emitted lights can be changed only by chemically modifying a skeletal structure common to the compounds, for example, by replacing functional groups of the compounds. If compounds emitting the lights of desired wavelengths are obtained by such a simple way, the kinds of raw materials and the steps of the producing processes will dramatically be reduced, compared with the conventional way in which a fluorescent material having a different skeletal structure was produced for each light of an intended wavelength.

This invention was made to overcome the above-mentioned problems. An objective of the invention is to provide new fluorescent compounds that are easily produced at a low cost.

Another objective of the invention is to provide fluorescent compounds that have the same basic skeletal structure and emit lights of desired different wavelengths by choosing functional groups bonded to the skeletal structure.

Still another objective of the invention is to provide a new compound emitting red light of which wavelength is 630–640 at the maximum.

DISCLOSURE OF THE INVENTION

The invention to achieve the objectives provides fluorescent compounds shown by general formula (1):

A—Ar—B          (1)

wherein Ar is an aromatic skeleton shown by general formula (2a) or (2b), A is an electron donating group, and B is an electron attractive group.

(2a)

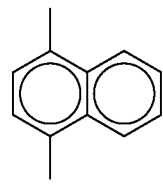

(2b)

In particular, electron donating group A with which the group or atom at the 2-position of naphthalene is replaced, is, for example, an alkylamino group, amino group, an aminoaryl group, an alkylaminoaryl group, an alkoxy group, an alkoxyaryl group, an arylalkoxy group, an alkyl group, an aryl group or a halogenated alkyl group. The alkylamino group, alkylaminoaryl group, the alkoxy group, the alkoxy moiety of the alkoxyaryl group, the alkoxy moiety of the arylalkoxy group, the alkyl group and the halogenated alkoxy group each have 1–20 carbon atoms. For the alkylamino group are used monoalkylamino groups and dialkylamino groups. The electron attractive group is an electron attractive ethenyl group or aldehyde group.

BEST MODE FOR CARRYING-OUT THE INVENTION

Figure 1:
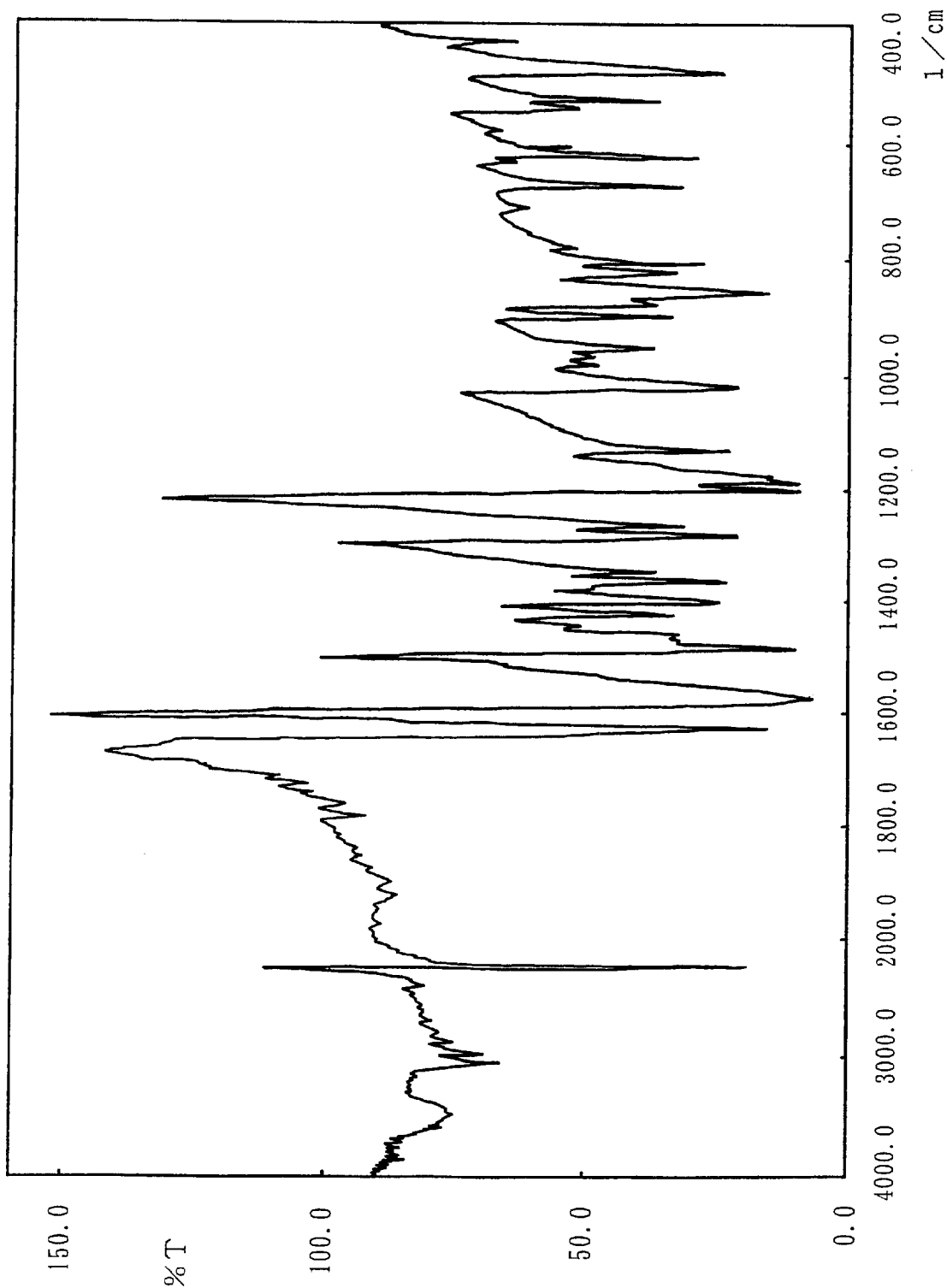
FIG. 1 is an IR chart of 6-methoxy-2-(dicyanoethenyl) naphthalene.

The fluorescent compound of the invention shown by general formula (1) is characterized that the compound has an electron donating group and an electron attractive group that are bonded to the aromatic skeleton shown by general formula (2a) or (2b).

The aromatic skeleton shown by general formula (2a) or (2b) is a naphthalene skeleton. The compound obtained by replacing the hydrogen atom at the 2-position and that at the 6-position with the electron donating group and the electron attractive group, respectively, and the compound obtained by replacing the hydrogen atom at the 1-position and that at the 4-position with the electron donating group and the electron attractive group, respectively exhibits fluorescent characteristics. If these groups are bonded to the compounds at positions other than those above-mentioned, fluorescent characteristics of the compounds could not be enhanced.

For electron donating group A can be used a group that increases the electron density of aromatic skeleton Ar. Examples of the group are an alkylamino group, amino group, an aminoaryl group, an alkylaminoaryl group, an alkoxy group, an alkoxyaryl group, an arylalkoxy group, an alkyl group, an aryl group and a halogenated alkyl group. The electron pushing-out force of these electron donating groups is considered to follow Hammett's rule. In order of strength of the electron pushing-out force, the arrangement of the electron donating groups is as follows: an alkylamino group, amino group, an alkoxy group, an arylalkoxy group, an alkyl group, etc.

The alkyl moieties of the alkylamino group, aminoaryl group and alkylaminoaryl group, the alkyl group itself, the alkoxy moieties of the alkoxyaryl group and arylalkoxy group, the alkoxy group itself, and the halogenated alkyl group each have 1–20 carbon atoms, preferably 1–10, more preferably 1–8, particularly preferably 1–6 carbon atoms. The alkylamino group includes monoalkylamino groups and dialkylamino groups. Also, the alkylaminoaryl group includes monoalkylaminoaryl groups and dialkylaminoaryl groups.

Although halogen atoms of the halogenated alkyl group may be bonded with the alkyl chain moiety at any positions, the halogenation preferably takes place at the terminal carbons of the alkyl chain moiety in the halogenated alkyl group.

Examples of the aryl moieties of the aminoaryl group, alkylaminoaryl group, alkoxyaryl group, arylalkoxy group and the aryl group itself are phenyl group, a naphthyl group, an anthryl group, etc. The amino moiety of the aminoaryl group and the alkylamino moiety of the alkylaminoaryl group may be bonded to the respective aryl residues at any position. When the aryl group is phenyl group, it is preferable that the para-positional hydrogen of phenyl group is replaced with amino group or the alkylamino group.

Of the electron donating compounds, recommendable are alkoxy groups having 1–20 carbon atoms, preferably 1–10 carbon atoms, more preferably 1–8 carbon atoms, most preferably 1–6 carbon atoms.

Examples of electron attractive group B are electron attractive ethenyl groups shown by the following general formula (3) and aldehyde groups.

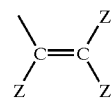
(3)

In formula (3), Z is hydrogen atom, cyano group, an ester group, a halogen atom such as fluorine atom or bromine atom, a halogenated alkyl group such as trifluoromethyl group, carboxyl group, an alkylcarbonyl group such as methylcarbonyl group, and groups shown by the following general formulae (4)–(7).

General Formula (4)

(4)

Formula (4), $Y^1$ denotes cyano group, an ester group, a halogen atom such as fluorine atom or bromine atom, or a halogenated alkyl group such as trifluoromethyl group. "n" means the number of $Y^1$ groups with which hydrogen atoms of the phenyl group are replaced, and is 1–5. Preferable $Y^1$ groups are cyano group and the halogenated alkyl group. When n is 1, preferably, the 4-position (para-position) hydrogen atom is replaced with $Y^1$. When n is 2, preferably, hydrogen atoms at 3- and 5-positions (meta-positions) are replaced. Of the groups shown by general formula (4) are preferable, for example, 4-cyanophenyl group, 4-trifloromethylphenyl group, 3,5-ditrichloromethylphenyl group, 4-dichloroethoxy-3,5-diflorophenyl group, etc.

General Formula (5)

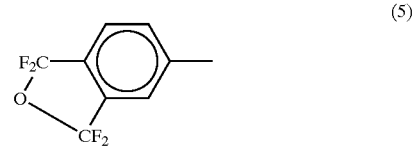
(5)

General Formula (6)

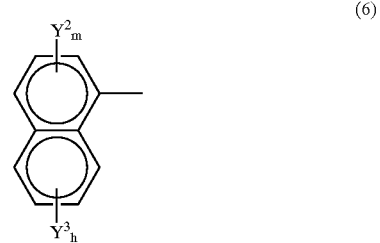
(6)

In formula (6), $Y^2$ and $Y^3$ each are cyano groups, ester groups, halogen atoms such as fluorine atom or bromine atom, or halogenated alkyl groups such as trifluoromethyl group. "m" means the number of $Y^2$ groups with which are replaced hydrogen atoms of that ring moiety of the naphthyl group which is bonded with the ethenyl group, and is 1–3. Preferable $Y^2$ groups are cyano group and the halogenated alkyl group. "h" denotes the number of $Y^3$ groups with which hydrogen atoms of another ring moiety of the naphthyl group are replaced, and is 1–4. Preferable $Y^3$ groups are cyano group and the halogenated alkyl group. Of the groups shown by general formula (6) are preferable, for example, 4-cyanonaphthyl group, 4-trichloromethylnaphthyl group, 3,6-ditrifloromethylnaphthyl group, etc.

General Formula (7)

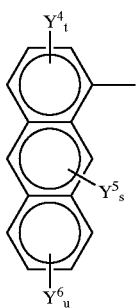

(7)

In formula (6), $Y^4$, $Y^5$ and $Y^6$ each are cyano groups, ester groups, halogen atoms such as fluorine atom or bromine atom, or halogenated alkyl groups such as trifluoromethyl group. "t" means the number of $Y^4$ groups with which are replaced hydrogen atoms of that ring part of the anthryl group which is substituted for a hydrogen atom of formula (3), and is 1–3. Preferable $Y^4$ groups are cyano group and the halogenated alkyl group. "s" denotes the number of $Y^5$ groups with which hydrogen atoms of the middle ring part of the anthryl group are replaced, and is 1–2. Preferable $Y^5$ groups are cyano group and the halogenated alkyl group. "u" denotes the number of $Y^6$ groups with which hydrogen atoms of the last ring of the anthryl group are replaced, and is 1–2. Preferable $Y^6$ groups are cyano group and the halogenated alkyl group. Of the groups shown by general formula (7) are preferable, for example, 9-cyanoanthryl group, 9-trifloro-methylanthryl group, etc.

The electron attractive groups have a stronger force of attracting electrons, as the number of cyano groups increases. Preferable examples of the ester groups are —COOR, wherein R is an alkyl group having 1–7 carbon atoms, preferably 1–3 carbon atoms, or phenyl group. Most preferable R is methyl or ethyl.

Preferable electron attractive ethenyl groups are those that have a hydrogen atom or cyano group substituted at the 1-position, and two cyano groups or a cyano group and a alkoxycarbonyl group substituted at the 2-position.

Fluorescent Compounds in accordance with this invention are caused to emit light by the application of such energy as electric energy or electromagnetic wave energy. Changing the electron density on the naphthalene ring by utilizing the relative force strength between the electron donating force of electron donating group A and the electron attractive force of electron attractive group B leads to the emission of variously colored lights accordingly.

As the strength of the electron donating force is gradually increased by changing electron donating groups A and simultaneously that of the electron attractive force is also gradually increased by changing electron attractive groups B, the light emitted by the fluorescent compounds having these combinations of the groups reaches red and further grows into deep red. On the other hand, as the strength of the electron donating force is gradually decreased by changing electron donating groups A and simultaneously that of the electron attractive force is also gradually decreased by changing electron attractive groups B, the color of the emitted light changes from red through orange and yellow in this order to green. In summary, the fluorescent compounds of this invention are capable of emitting light having a desired color from red to blue by appropriately choosing electron donating groups A and electron attractive groups B.

Typical examples of the fluorescent compounds in accordance with the invention are 6-alkoxy-2-(tricyanoethenyl) naphthalene, 6-alkoxy-2-(dicyanoethenyl)naphthalene, 6-alkoxy-2-(2-cyano-2-alkoxycarbonylethenyl) naphthalene, 6-alkoxy-2-(1,2-dicyano-2-alkoxycarbonylethenyl)naphthalene, 6-alkoxy-2-bis (alkoxycarbonyl)ethenylnaphthalene, 6-monoalkylamino-2-(tricyanoethenyl)naphthalene, 6-monoalkylamino-2-(dicyanoethenyl)naphthalene, 6-monoalkylamino-2-(2-cyano-2-alkoxycarbonylethenyl)naphthalene, 6-monoalkylamino-2-(1,2-dicyano-2-alkoxycarbonylethenyl)naphthalene, 6-monoalkylamino-2-bis(alkoxycarbonyl)ethenylnaphthalene, 6-dialkylamino-2-(tricyanoethenyl)naphthalene, 6-dialkylamino-2-(dicyanoethenyl)naphthalene, 6-dialkylamino-2-(2-cyano-2-alkoxycarbonylethenyl)naphthalene, 6-dialkylamino-2-(1,2-dicyano-2-alkoxycarbonylethenyl)naphthalene, 6-dialkylamino-2-bis(alkoxycarbonyl)ethenylnaphthalene, 6-amino-2-(tricyanoethenyl)naphthalene, 6-amino-2-(dicyanoethenyl)naphthalene, 6-amino-2-(2-cyano-2-alkoxycarbonylethenyl)naphthalene, 6-amino-2-(1,2-dicyano-2-alkoxycarbonylethenyl)naphthalene, 6-amino-2-bis(alkoxycarbonyl)ethenylnaphthalene, 6-(p-aminophenyl)-2-(tricyanoethenyl)naphthalene, 6-(p-aminophenyl)-2-(dicyanoethenyl)naphthalene, 6-(p-aminophenyl)-2-(2-cyano-2-alkoxycarbonylethenyl) naphthalene, 6-(p-aminophenyl)-2-(1,2-dicyano-2-alkoxycarbonylethenyl)naphthalene, 6-(p-aminophenyl)-2-bis(alkoxycarbonyl)ethenylnaphthalene, 6-(p-monoalkylaminophenyl)-2-(tricyanoethenyl)naphthalene, 6-(p-monoalkylaminophenyl)-2-(dicyanoethenyl) naphthalene, 6-(p-monoalkylaminophenyl)-2-(2-cyano-2-alkoxycarbonylethenyl)naphthalene, 6-(p-monoalkylaminophenyl)-2-(1,2-dicyano-2-alkoxycarbonylethenyl)naphthalene, 6-(p-monoalkylaminophenyl)-2-bis(alkoxycarbonyl) ethenylnaphthalene, 6-(p-dialkylaminophenyl)-2-(tricyanoethenyl)naphthalene, 6-(p-dialkylaminophenyl)-2-(dicyanoethenyl)naphthalene, 6-(p-dialkylaminophenyl)-2-(2-cyano-2-alkoxycarbonylethenyl)naphthalene, 6-(p-dialkylaminophenyl)-2-(1,2-dicyano-2-alkoxycarbonylethenyl)naphthalene, 6-(p-dialkylaminophenyl)-2-bis(alkoxycarbonyl) ethenylnaphthalene, 6-(p-alkoxyphenyl)-2-(tricyanoethenyl)naphthalene, 6-(p-alkoxyphenyl)-2-(dicyanoethenyl)naphthalene, 6-(p-alkoxyphenyl)-2-(2-cyano-2-alkoxycarbonylethenyl)naphthalene, 6-(p-alkoxyphenyl)-2-(1,2-dicyano-2-alkoxycarbonylethenyl) naphthalene, 6-(p-alkoxyphenyl)-2-bis(alkoxycarbonyl) ethenylnaphthalene, 6-phenylalkoxy-2-(tricyanoethenyl) naphthalene, 6-phenylalkoxy-2-(dicyanoethenyl) naphthalene, 6-phenylalkoxy-2-(2-cyano-2-alkoxycarbonylethenyl)naphthalene, 6-phenylalkoxy-2-(1, 2-dicyano-2-alkoxycarbonylethenyl)naphthalene, 6-phenylalkoxy-2-bis(alkoxycarbonyl)ethenylnaphthalene, 6-alkyl-2-(tricyanoethenyl)naphthalene, 6-alkyl-2-(dicyanoethenyl)naphthalene, 6-alkyl-2-(2-cyano2-alkoxycarbonylethenyl)naphthalene, 6-alkyl-2-(1,2-dicyano-2-alkoxycarbonylethenyl)naphthalene, 6-alkyl-2-bis(alkoxycarbonyl)ethenylnaphthalene, 6-haloalkyl-2-(tricyanoethenyl)naphthalene, 6-haloalkyl-2-(dicyanoethenyl)naphthalene, 6-haloalkyl-2-(2-cyano-2-alkoxycarbonylethenyl)naphthalene, 6-haloalkyl-2-(1,2-dicyano-2-alkoxycarbonylethenyl)naphthalene, 6-haloalkyl-2-bis(alkoxycarbonyl)ethenylnaphthalene, etc.

Of these compounds are preferred 6-alkoxy-2-(tricyanoethenyl)naphthalene, 6-alkoxy-2-(dicyanoethenyl) naphthalene, 6-alkoxy-2-(2-cyano-2-alkoxycarbonylethenyl)naphthalene, 6-alkoxy-2-(1,2- dicyano-2-alkoxycarbonylethenyl)naphthalene, 6-alkoxy-2-bis(alkoxycarbonyl)ethenylnaphthalene, etc.

Preferable examples of the fluorescent compounds in accordance with the invention can be shown by general formula (8) below.

General Formula (8)

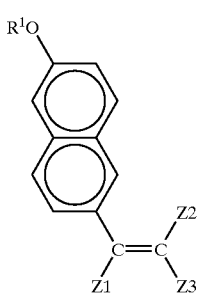

(8)

In formula (8), $R^1O$— denotes an alkoxy group having 1–20, preferably 1–10, more preferably 1–8, particularly preferably 1–6 carbon atoms. Z1 is hydrogen atom or cyano group. Z2 is also hydrogen atom or cyano group. Z3 is cyano group, an alkyloxycarbonyl group wherein the alkyl moiety thereof has 1–5 carbon atoms, a phenyl group having a substituent of cyano group or a trihalomethyl group, or a naphthyl group having a substituent of cyano group or a trihalomethyl group.

It should be noted that fluorescent compounds of this invention are not limited to those mentioned above.

The reason why the fluorescent compounds of the invention emit light of various colors by the application of such energy as electricity or electromagnetic wave is as follows. Compounds having a naphthalene ring are inherently fluorescent. In such compounds, when a π electron that is in the highest occupied molecular orbital of the naphthalene ring is excited by energy such as electromagnetic energy, the electron is moved to the lowest unoccupied molecular orbital. Then, the π electron emits light when it returns to the occupied molecular orbital. It is known that in naphthalene rings π electrons are conjugated with each other, or an intermolecular charge transfer is observed. In naphthalene compounds of the invention, by a mutual interaction through the π orbitals between the electron donating group and the electron attractive group that are substituted at the 2- and 6-positions or at the 1- and 4-positions, the π electron system becomes more stable by resonance, which leads to a smaller energy gap between π and π* levels and contributes to an easier occurrence of the electron transition. Consequently, we suppose, the emission of red light was achieved by this invention.

Energy sources used for this invention are, for example, such electric energies as obtainable by applying a voltage, or electromagnetic energies.

Naphthalene, which is the raw material of the fluorescent compounds in accordance with the invention, is excellent in light emitting efficiency. Naphthalene products with high purity can be obtained at a low price. Consequently, in accordance with this invention, fluorescent compounds with high light-emitting efficiency can be produced at high purity and at a low cost.

The fluorescent compounds of the invention may be used for EL elements, discharge lamps, fluorescent paints, X-ray fluorescent plates, X-ray intensifying screens, cathode-ray tubes, scintillators, infrared detectors, etc.

The fluorescent compounds can be synthesized through ordinary organic synthetic reactions that replace hydrogen atoms with an electron donating compound and an electron attractive compound at predetermined positions.

WORKING EXAMPLE 1

Synthesis of 6-Methoxy-2-(dicyanoethenyl) naphthalene 8.0 g (43.0 mmol) of 6-methoxy-2-naphthoaldehyde and 2.84 g (43.0 mmol) of malononitrile were placed in a 200 ml four-necked flask with a mechanical stirrer and an Allihn condenser. To them were added 100 ml of ethanol as a solvent and 3.65 g (43.0 mmol) of piperidine. The flask was heated to 60° C. in a silicone oil bath and the mixture was reacted for 3 hours. After the completion of the reaction, the flask was cooled to the room temperature. The resulting mixture was subjected to suction filtration with a glass filter and the remaining precipitate was washed with a little amount of methanol. The obtained was a yellow solid material. The solid material was recrystallized with ethanol and acetone, and dried in vacuo, which results in 5.8 g of yellow crystals.

These yellow crystals were identified as 6-methoxy-2-(dicyanoethenyl)naphthalene from the IR chart shown in FIG. 1. The yield was 58%. The compound had melting temperatures of 189–191° C. The followings are the results of elemental analysis.

Found: C, 77.15%; H, 3.82%; N, 11.91%; Calculated: C, 77.24%; H, 3.89%; N, 12.01%.

Figure 2:
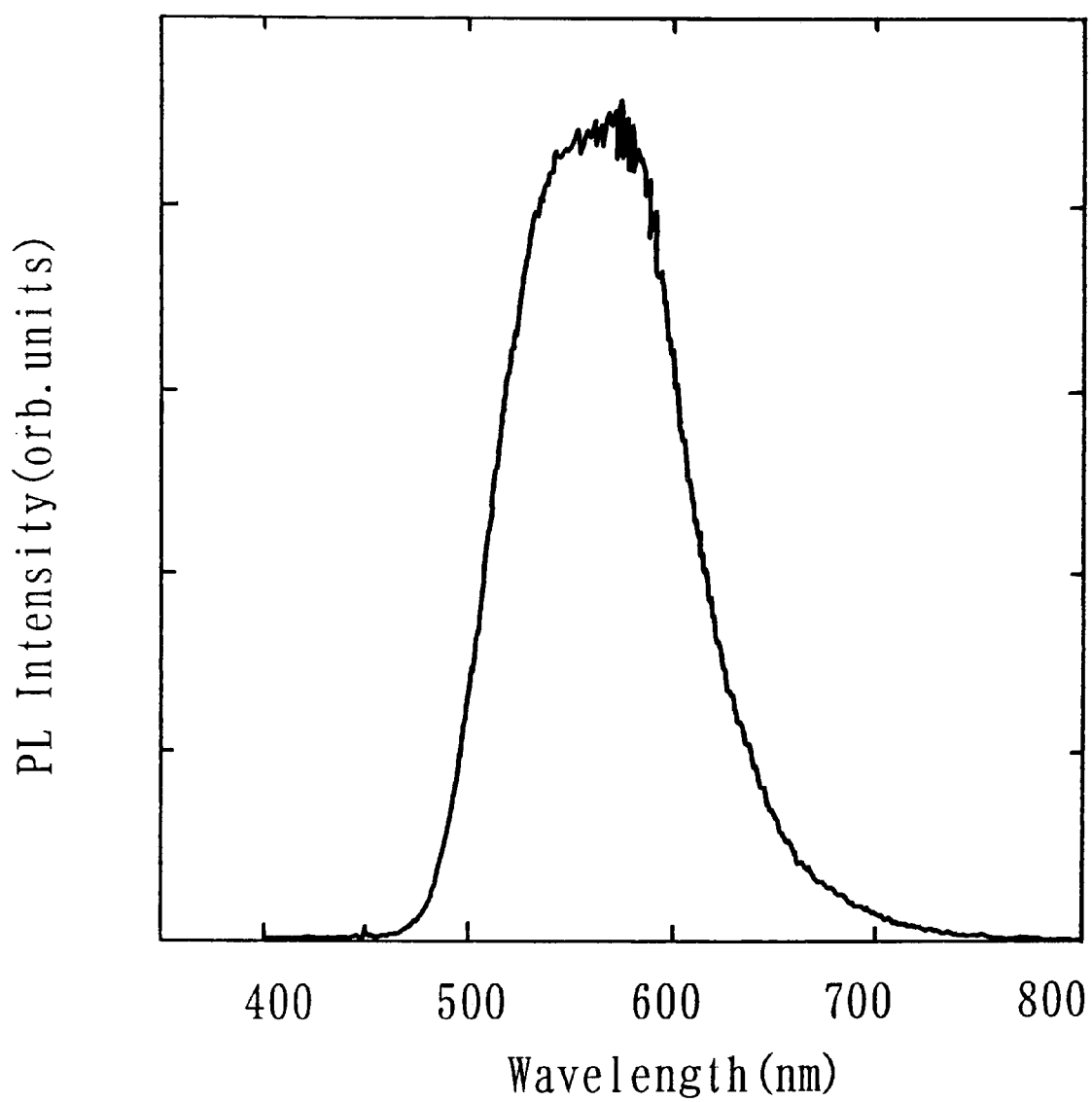
FIG. 2 is a graph showing light emitting characteristics of 6-methoxy-2-(dicyanoethenyl)naphthalene.

When the yellow crystals were irradiated with an ultraviolet ray having a wavelength of 365 nm using a SPECTRO LINE Model ENF-240 c/s apparatus, which is an ultraviolet ray irradiation apparatus, these yellow crystals emitted yellow green light. This phenomenon qualitatively confirmed the fluorescent emission of the obtained compound. Also, when the yellow crystals were irradiated with a He—Cd laser beam having a wavelength of 325 nm and an intensity of 8 mW at 23° C., it was observed that these yellow crystals emitted a light having a maximum wavelength of 560 nm. See FIG. 2.

WORKING EXAMPLE 2

Synthesis of 6-Methoxy-2-(tricyanoethenyl) naphthalene 2.59 g (11.1 mmol) of 6-methoxy-2-(dicyanoethenyl) naphthalene was placed in a 200 ml four-necked flask with a mechanical stirrer and an Allihn condenser. To it were added 30 ml of N,N-dimethyl formamide as a solvent and an aqueous solution of 0.54 g (11.1 mmol) of sodium cyanide with 1.0 ml of water. 10-minute stirring of the obtained mixture was followed by the addition of 4.90 g (11.1 mmol) of lead tetraacetate. The reaction was carried out for 30 minutes. After the completion of the reaction, 100 ml of chloroform was added to the mixture. The resulting solution was washed with 50 ml of water using a separatory funnel, which was followed by the addition of sodium sulfate to the washed solution. The solution was allowed to stand for 30 minutes for dehydration. The dehydrated solution was concentrated with an evaporator and dried in vacuo. The obtained was a red solid material. The solid material was recrystallized with benzene, which resulted in 1.2 g of red crystals.

Figure 3:
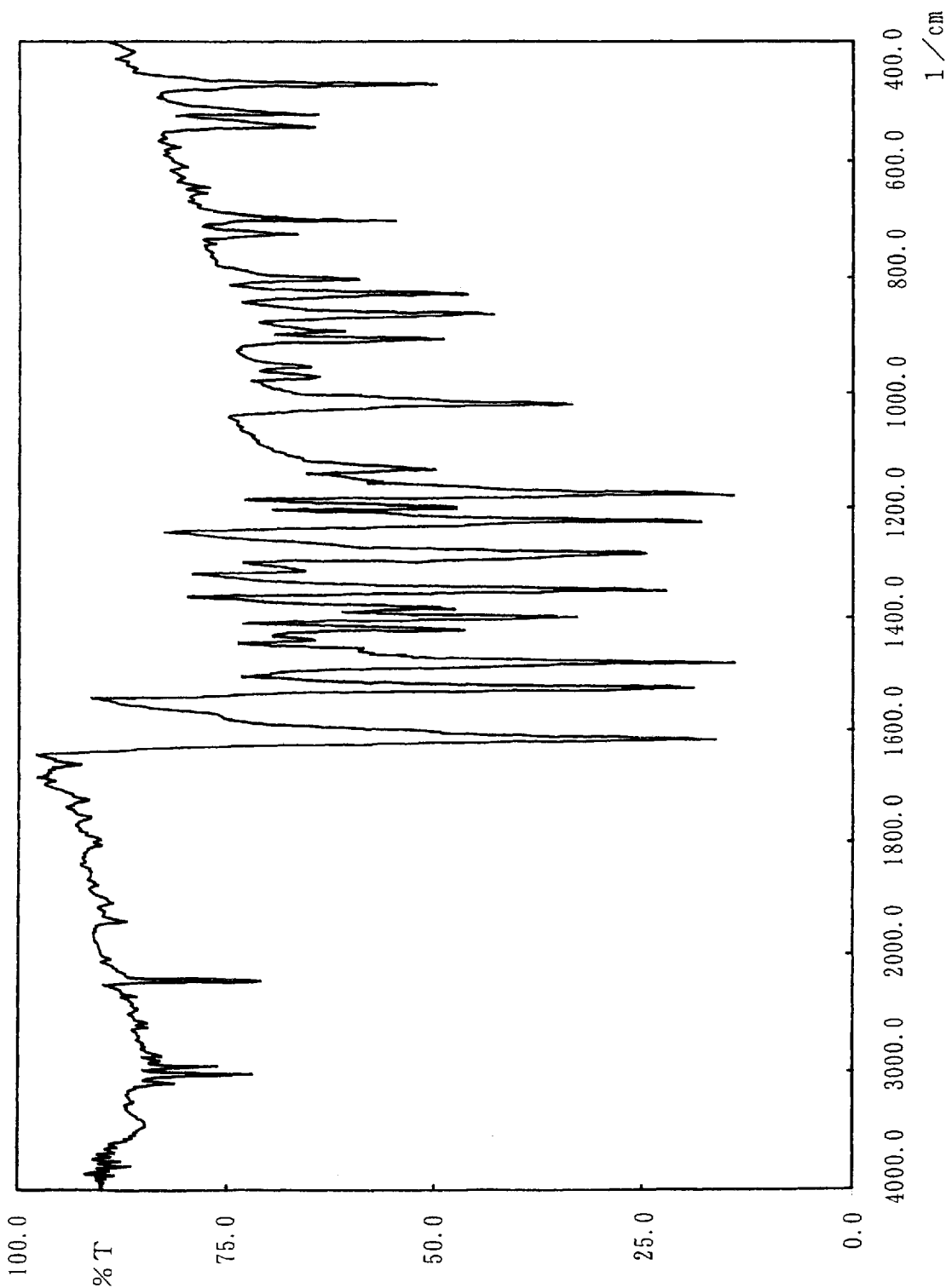
FIG. 3 is an IR chart of 6-methoxy-2-(tricyanoethenyl) naphthalene.

These red crystals were identified as 6-methoxy-2-(tricyanoethenyl)naphthalene from the IR chart shown in FIG. 3. The yield was 42%. The compound had melting temperatures of 193–195° C. The followings are the results of elemental analysis.

Found: C, 74.05%; H, 3.42%; N, 16.02%; Calculated: C, 74.12%; H, 3.50%; N, 16.21%.

Figure 4:
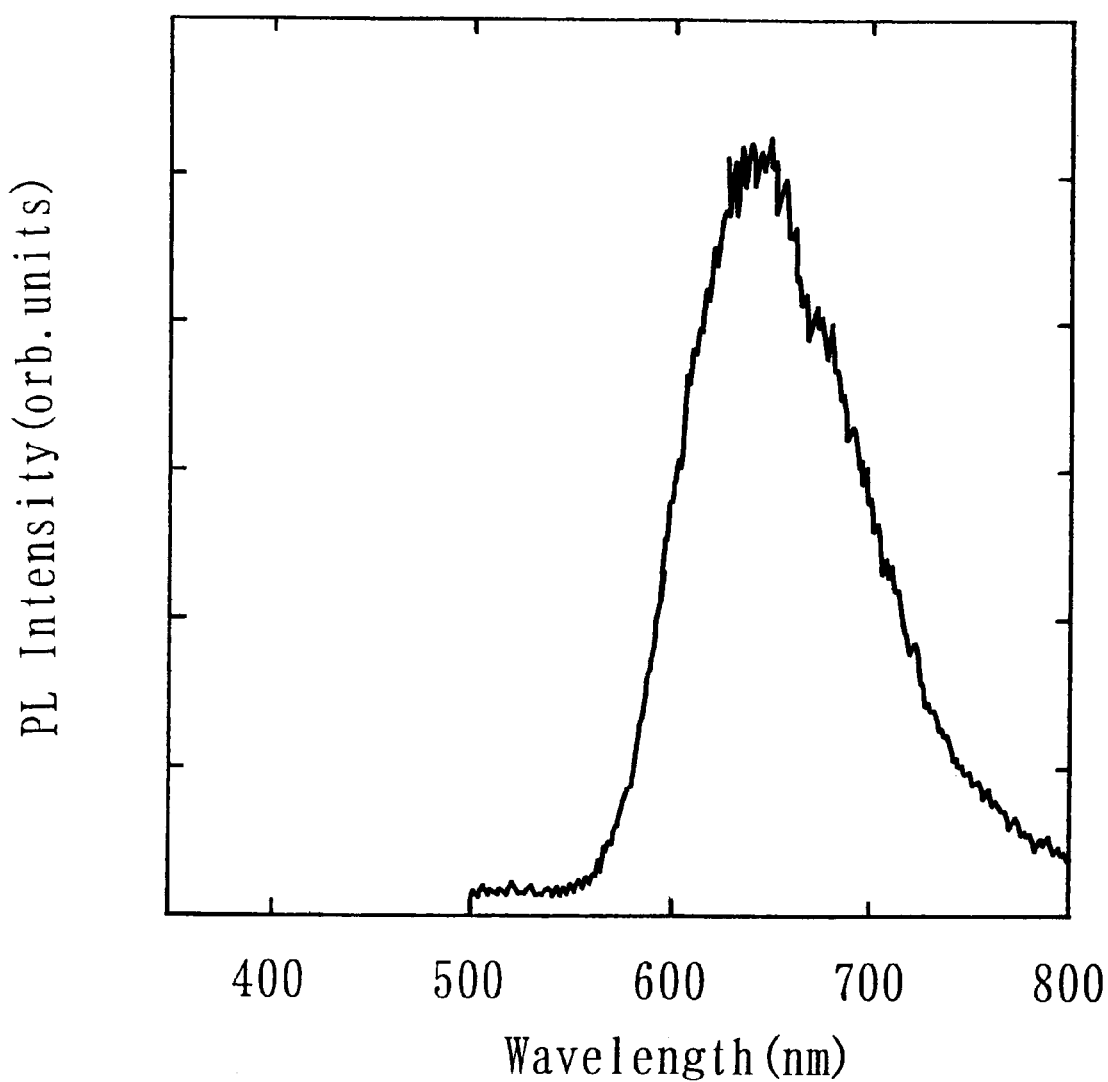
FIG. 4 is a graph showing light emitting characteristics of 6-methoxy-2-(tricyanoethenyl)naphthalene.

When the yellow crystals were irradiated with an ultraviolet ray having a wavelength of 365 nm using a SPECTRO LINE Model ENF-240 c/s apparatus, which is an ultraviolet ray irradiation apparatus, these red crystals emitted red light. This phenomenon qualitatively confirmed the fluorescent emission of the obtained compound. Also, when the red crystals were irradiated with a He—Cd laser beam having a wavelength of 325 nm and an intensity of 8 mW at 23° C., it was observed that these red crystals emitted a light having a maximum wavelength of 640 nm. See FIG. 4.

WORKING EXAMPLE 3

Synthesis of 6-Methoxy-2-(2-cyano-2-ethoxylcarbonylethenyl)naphthalene 5.0 g (26.9mmol) of 6-methoxy-2-naphthoaldehyde and 3.04 g (26.9 mmol) of ethyl cyanoacetate were placed in a 200 ml four-necked flask with a mechanical stirrer and an Allihn condenser. To them were added 63 ml of ethanol as a solvent and 2.28 g (26.9 mmol) of piperidine. The flask was heated to 60° C. in a silicone oil bath and the mixture was reacted for 3 hours. After the completion of the reaction, the flask was cooled to the room temperature. The resulting mixture was subjected to suction filtration with a glass filter and the remaining precipitate was washed with a little amount of methanol. The obtained was a light yellow solid material. The solid material was recrystallized with ethanol, and dried in vacuo, which results in 6.6 g of light yellow crystals.

Figure 5:
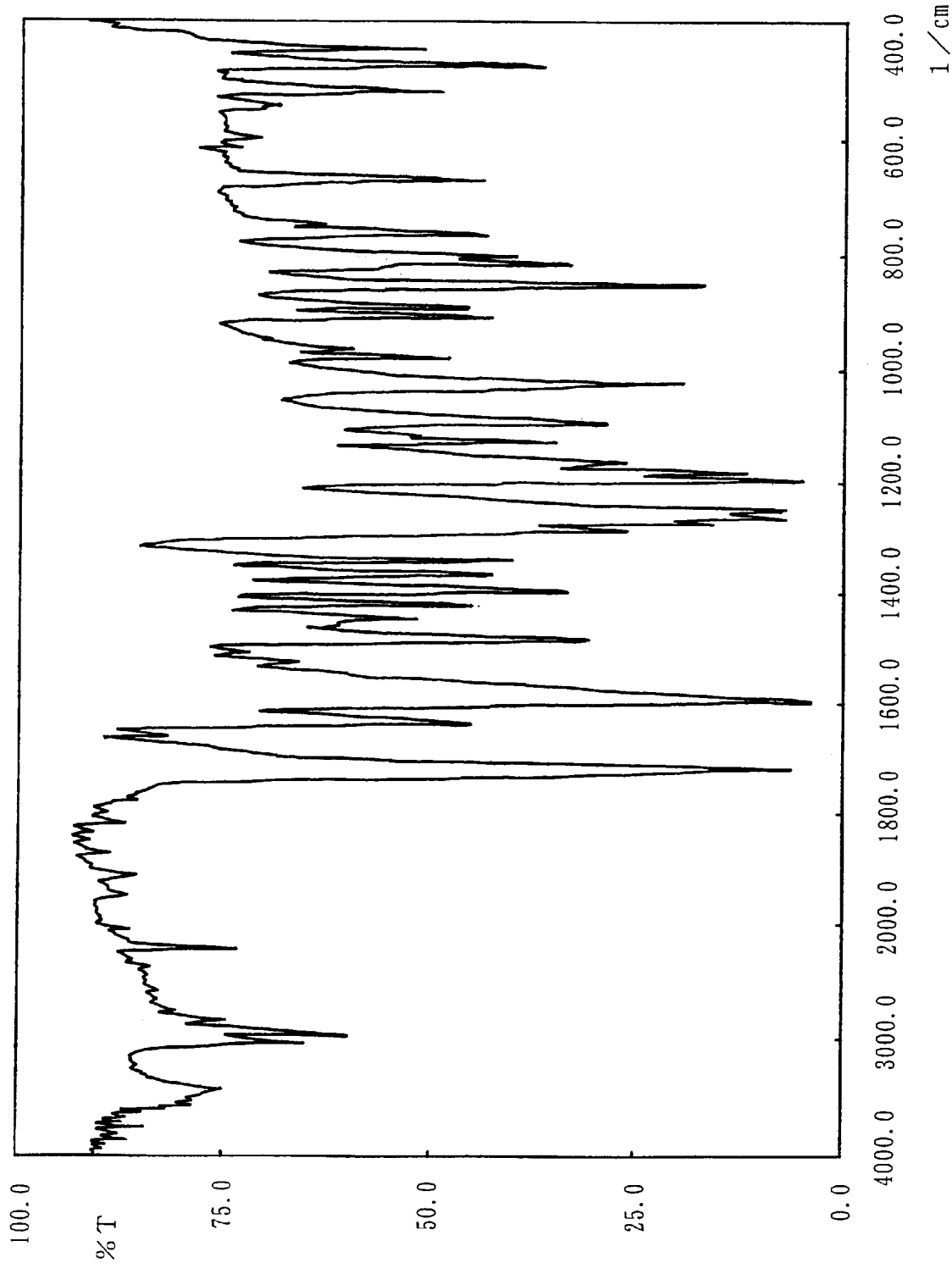
FIG. 5 is an IR chart of 6-methoxy-2-(2-cyano-2-ethoxycarbonylethenyl)naphthalene.

These light yellow crystals were identified as 6-methoxy-2-(2-cyano-2-ethoxylcarbonylethenyl) naphthalene from the IR chart shown in FIG. 5. The yield was 87%. The compound had melting temperatures of 115–118° C. The followings are the results of elemental analysis.

Found: C, 72.35%; H, 5.32%; N, 4.72%; Calculated: C, 72.58%; H, 5.37%; N, 4.98%.

Figure 6:
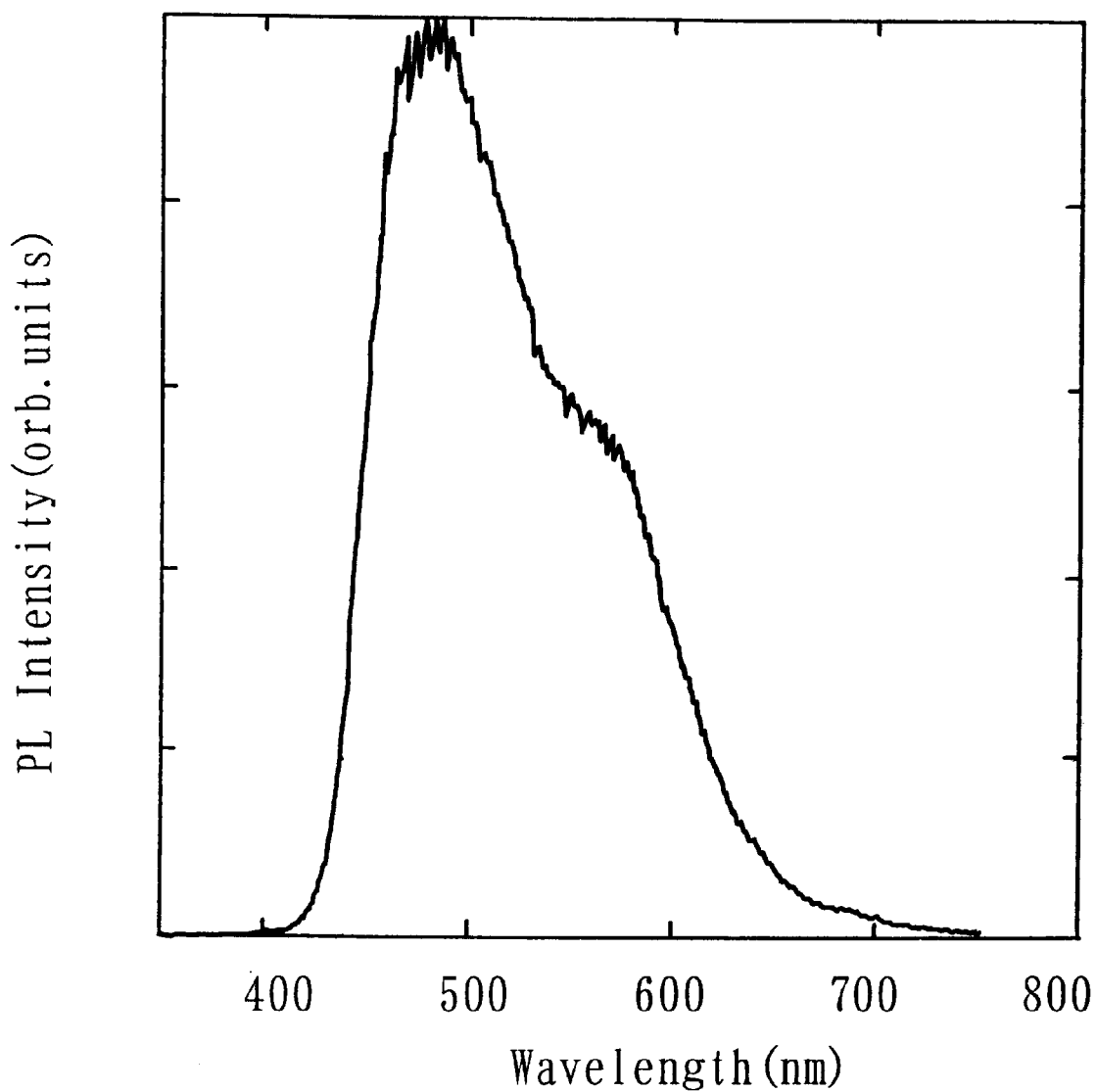
FIG. 6 is a graph showing light emitting characteristics of 6-methoxy-2-(2-cyano-2-ethoxycarbonylethenyl) naphthalene.

When the light yellow crystals were irradiated with an ultraviolet ray having a wavelength of 365 nm using a SPECTRO LINE Model ENF-240 c/s apparatus, which is an ultraviolet ray irradiation apparatus, these light yellow crystals emitted blue light. This phenomenon qualitatively confirmed the fluorescent emission of the obtained compound. Also, when the light yellow crystals were irradiated with a He—Cd laser beam having a wavelength of 325 nm and an intensity of 8 mW at 23° C., it was observed that these light yellow crystals emitted a light having a maximum wavelength of 475 nm. See FIG. 6.

WORKING EXAMPLE 4

Synthesis of 6-Methoxy-2-(1,2-dicyano-2-ethoxycarbonylethenyl)naphthalene 3.60 g (12.8 mmol) of 6-methoxy-2-(2-cyano-2-ethoxycarbonylethenyl) naphthalene was placed in a 200 ml four-necked flask with a mechanical stirrer and an Allihn condenser. To it were added 40 ml of N,N-dimethyl formamide as a solvent and an aqueous solution of 0.63 g (12.8 mmol) of sodium cyanide with 1.0 ml of water. 10-minute stirring of the obtained mixture was followed by the addition of 5.67 g (12.8 mmol) of lead tetraacetate. The reaction was carried out for 30 minutes. After the completion of the reaction, 100 ml of chloroform was added to the mixture. The resulting solution was washed with 50 ml of water using a separatory funnel, which was followed by the addition of sodium sulfate to the washed solution. The solution was allowed to stand for 30 minutes for dehydration. The dehydrated solution was concentrated with an evaporator and dried in vacuo. The obtained was an orange solid material. The solid material was recrystallized with ethanol, which resulted in 2.3 g of orange crystals.

Figure 7:
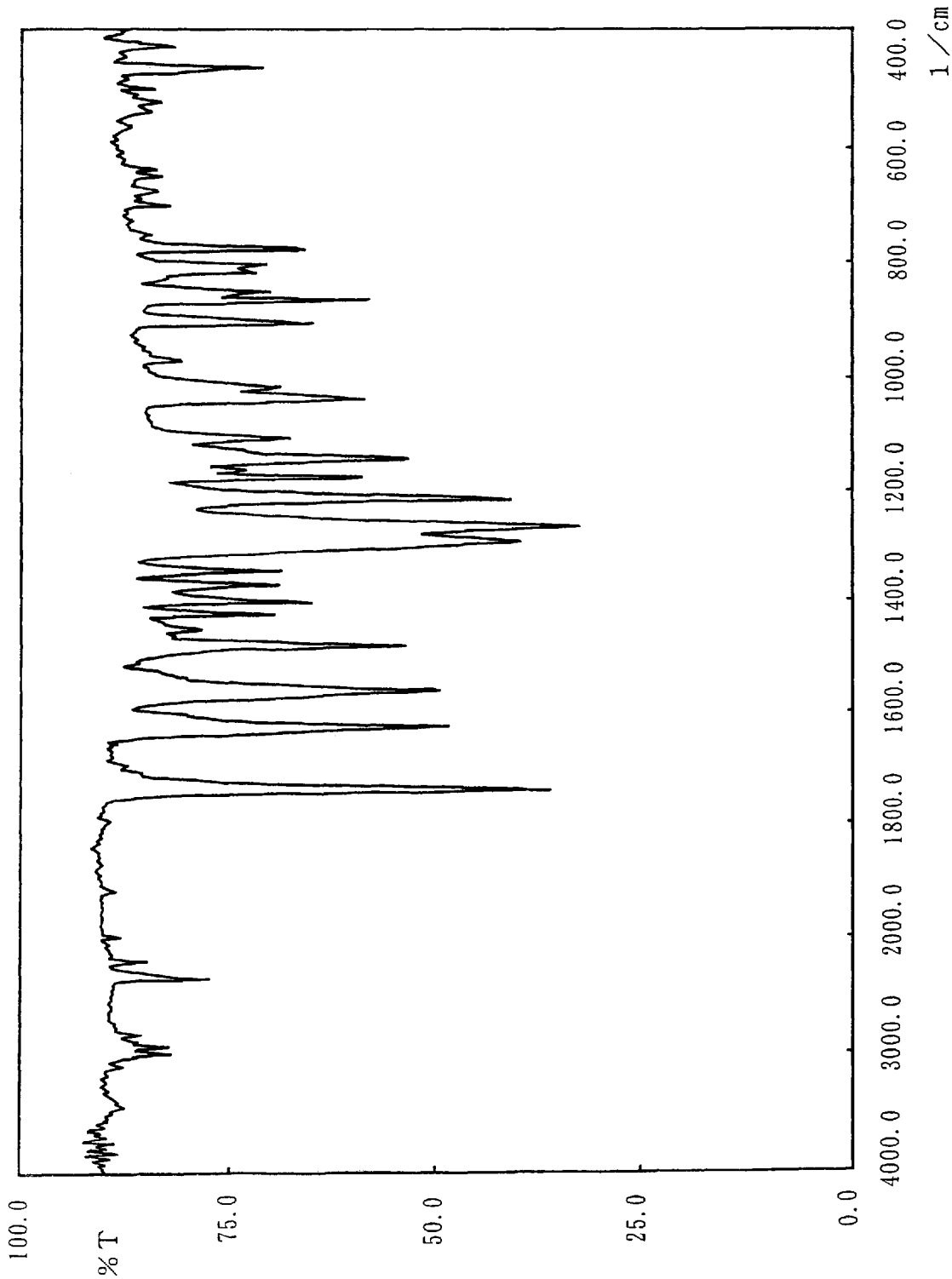
FIG. 7 is an IR chart of 6-methoxy-2-(1,2-dicyano-2-ethoxycarbonylethenyl)naphthalene.

These orange crystals were identified as 6-methoxy-2-(1,2-dicyano-2-ethoxycarbonylethenyl)naphthalene from the IR chart shown in FIG. 7. The yield was 59%. The compound had melting temperatures of 147–148° C. The followings are the results of elemental analysis.

Found: C, 70.32%; H, 4.51%; N, 9.08%; Calculated: C, 70.58%; H, 4.61%; N, 9.15%.

When the orange crystals were irradiated with an ultraviolet ray having a wavelength of 365 nm using a SPECTRO LINE Model ENF-240 c/s apparatus, which is an ultraviolet ray irradiation apparatus, these orange crystals emitted orange light. This phenomenon qualitatively confirmed the fluorescent emission of the obtained compound. Also, when the orange crystals were irradiated with a He—Cd laser beam having a wavelength of 325 nm and an intensity of 8 mW at 23° C., it was observed that these orange crystals emitted a light having a maximum wavelength of 590 nm.

WORKING EXAMPLE 5

1.0 g (5.37 mmol) of 6-methoxy-2-naphthoaldehyde and 0.76 g (5.37 mmol) of 4-cyanophenylacetonitrile were placed in a 200 ml four-necked flask with a mechanical stirrer and an Allihn condenser. To them were added 50 ml of ethanol as a solvent and 0.46 g (5.37 mmol) of piperidine. The flask was heated to 60° C. in a silicone oil bath and the mixture was reacted for 4 hours. After the completion of the reaction, the flask was cooled to the room temperature. The resulting mixture was subjected to suction filtration with a glass filter and the remaining precipitate was washed with a little amount of methanol. The obtained was a yellow solid material of 1.50 g.

Figure 8:
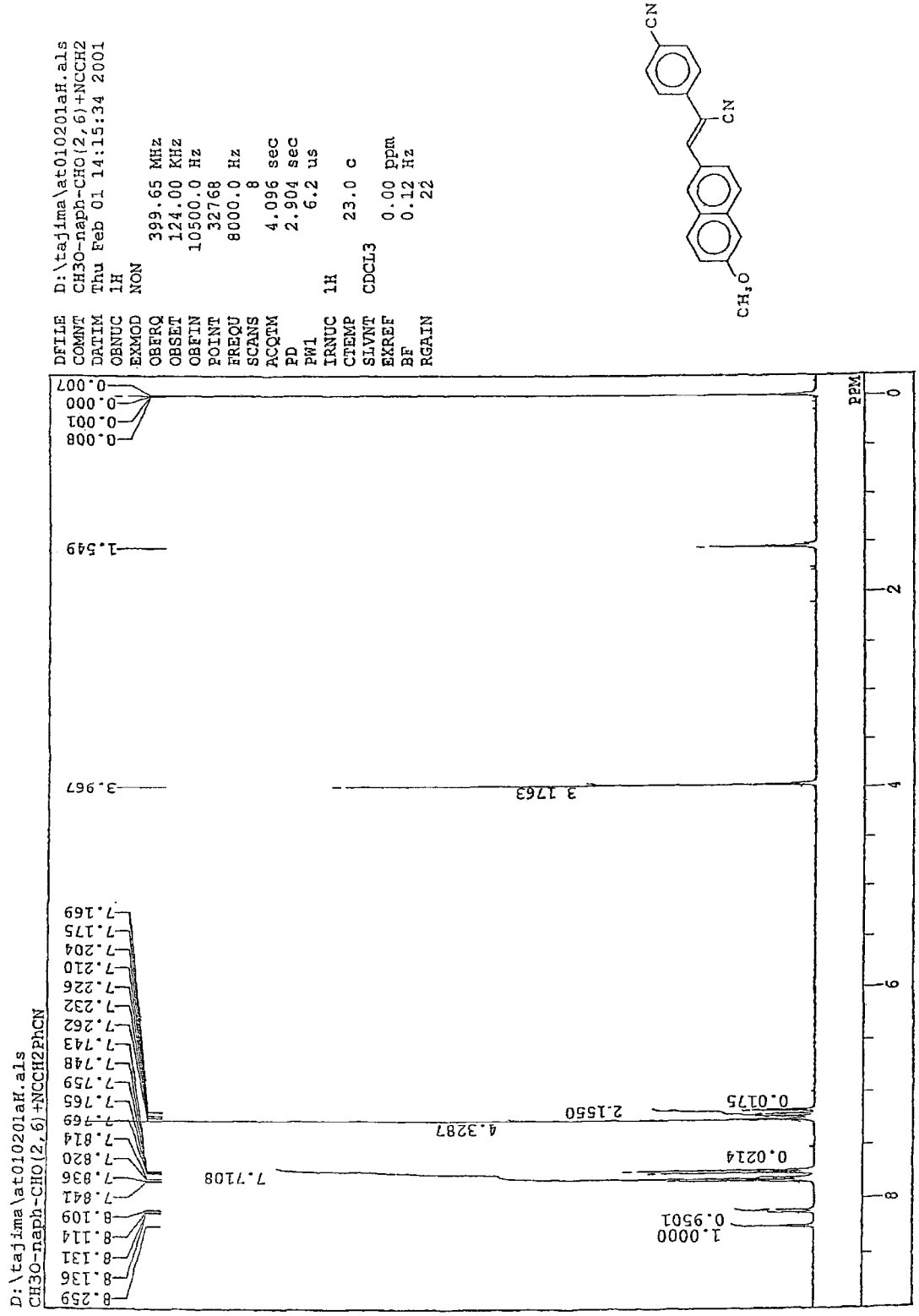
FIG. 8 is an NMR chart of the fluorescent compound obtained in Example 5.

This yellow material had a chemical structure shown in FIG. 8. The yield was 91%. An NMR chart of the compound is shown in FIG. 8. The followings are the results of elemental analysis.

Found: C, 82.14%; H, 3.32%; N, 9.28%; Calculated: C, 82.34%; H, 3.29%; N, 9.14%.

WORKING EXAMPLE 6

1.00 g (3.26 mmol) of the compound prepared in Working Example 5 was placed in a 200 ml four-necked flask with a mechanical stirrer and an Allihn condenser. To it were added 20 ml of N,N-dimethyl formamide as a solvent and an aqueous solution of 0.16 g (3.26 mmol) of sodium cyanide with 1.0 ml of water. 5-minute stirring of the obtained mixture was followed by the addition of 1.45 g (3.26 mmol) of lead tetraacetate. The reaction was carried out for 5 minutes. After the completion of the reaction, 100 ml of chloroform was added to the mixture. The resulting solution was washed with 50 ml of water using a separatory funnel, which was followed by the addition of sodium sulfate to the washed solution. The solution was allowed to stand for 30 minutes for dehydration. The dehydrated solution was concentrated with an evaporator. The obtained was a vermilion solid material of 0.30 g.

Figure 9:
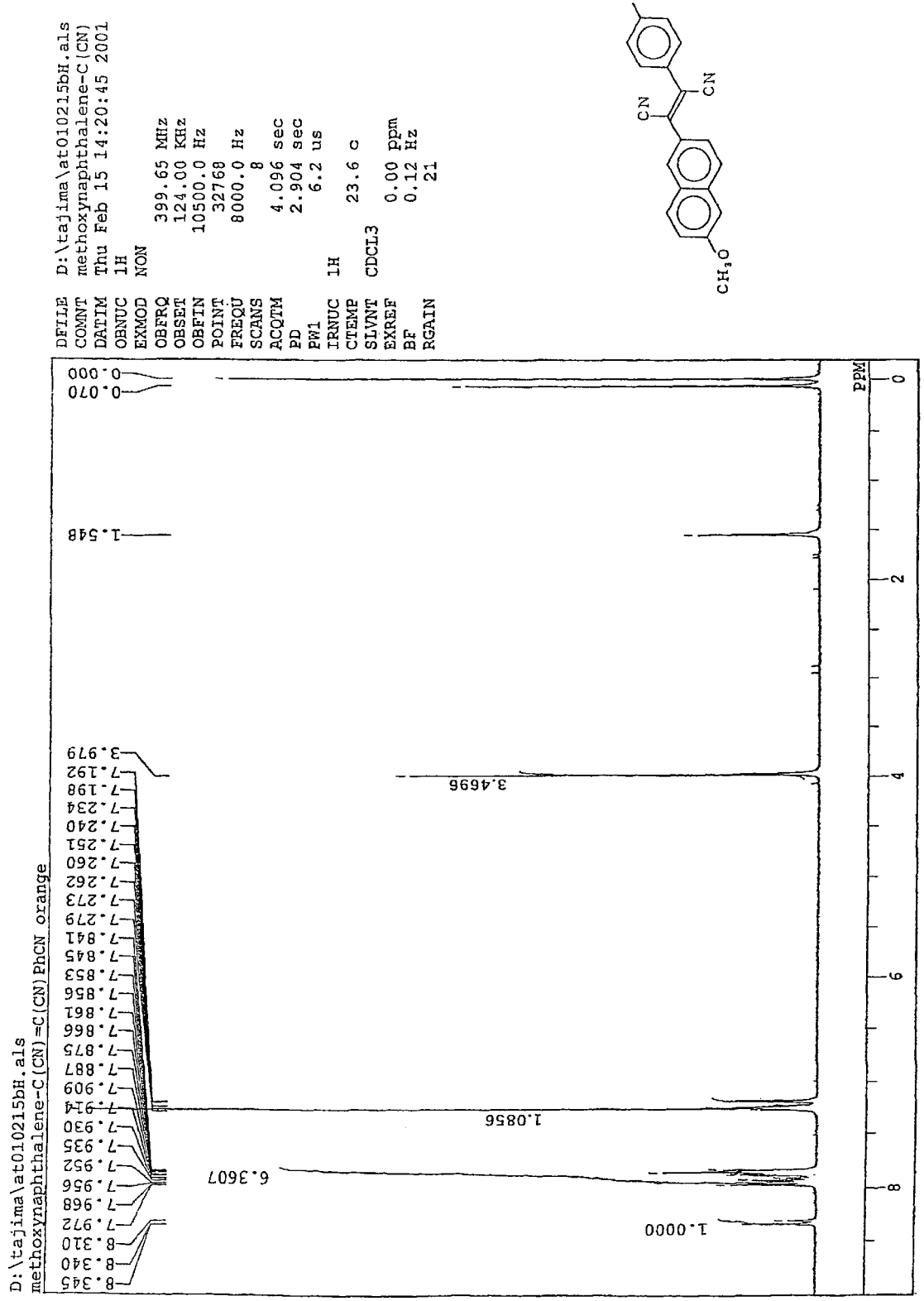
FIG. 9 is an NMR chart of the fluorescent compound obtained in Example 6.

This vermilion material had a chemical structure shown in FIG. 9. The yield was 27%. An NMR chart of the compound is shown in FIG. 9. The followings are the results of elemental analysis.

Found: C, 79.52%; H, 2.84%; N, 12.73%; Calculated: C, 79.75%; H, 2.74%; N, 12.68%.

WORKING EXAMPLE 7

0.12 g (0.66 mmol) of 6-methoxy-2-naphthoaldehyde and 0.20 g (0.66 mmol) of 3,7-bis(trifluoromethyl)naphthalene-1-acetonitrile were placed in a 200 ml four-necked flask with a mechanical stirrer and an Allihn condenser. To them were added 30 ml of ethanol as a solvent and 0.06 g (0.66 mmol) of piperidine. The flask was heated to 60° C. in a silicone oil bath and the mixture was reacted overnight. After the completion of the reaction, the flask was cooled to the room temperature. The resulting mixture was subjected to suction filtration with a glass filter and the remaining precipitate was washed with a little amount of methanol. The obtained was a light yellow solid material of 0.07 g.

Figure 10:
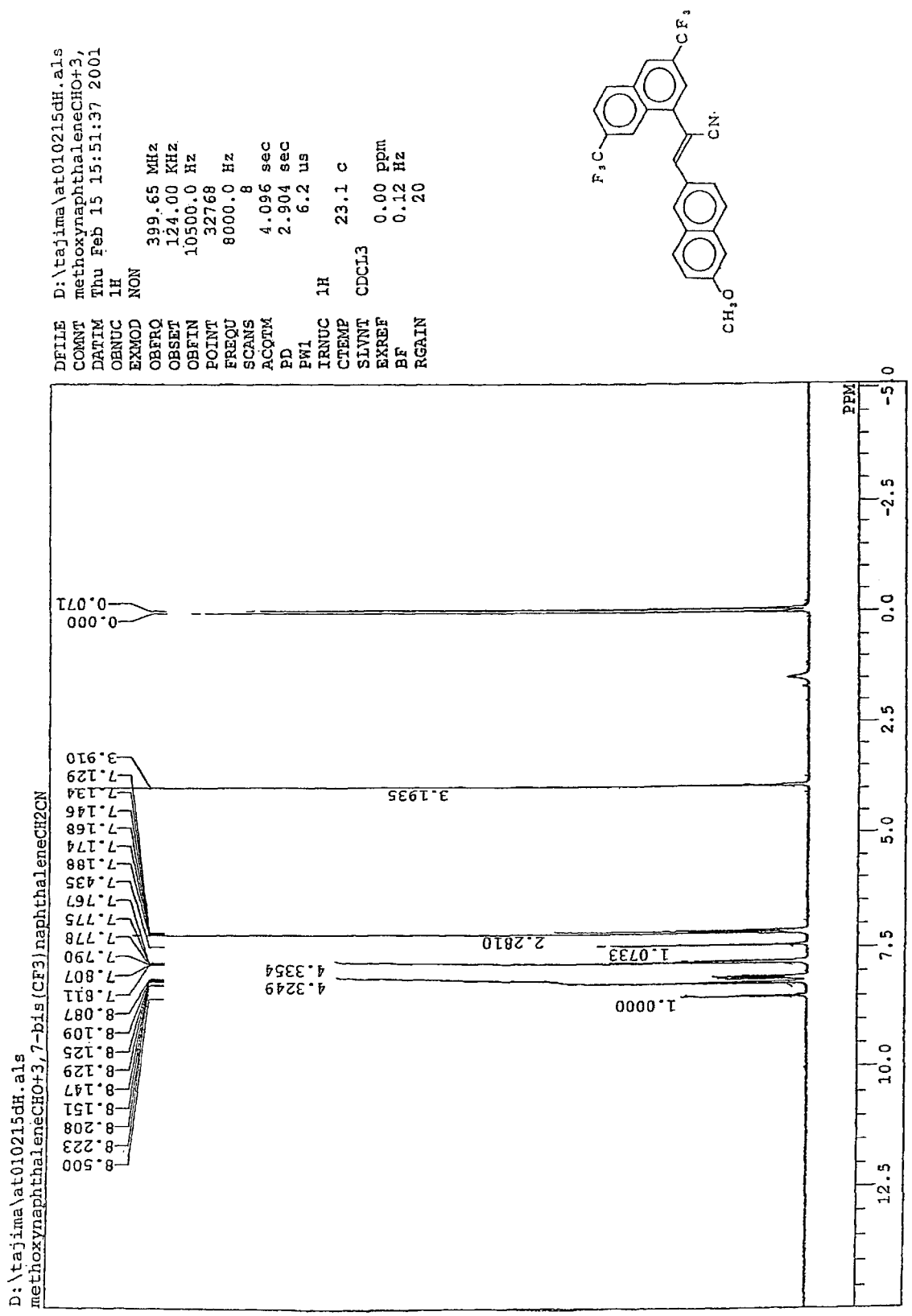
FIG. 10 is an NMR chart of the fluorescent compound obtained in Example 7.

This light yellow material had a chemical structure shown in FIG. 10. The yield was 22%. An NMR chart of the compound is shown in FIG. 10. The followings are the results of elemental analysis.

Found: C, 66.52%; H, 3.18%; N, 3.00%; Calculated: C, 66.25%; H, 3.21%; N, 2.97%.

Industrial Applicability

This invention can provide fluorescent compounds with high emitting efficiency and high purity, which can also be produced at a low cost.

The fluorescent compound of this invention is capable of emitting light having a desired color from red to blue by appropriately choosing electron donating group A and electron attractive group B.

What is claimed is:
1. A fluorescent compound of formula (1):

(1), wherein

Ar is an aromatic group of formula (2a) or (2b),

(2a)

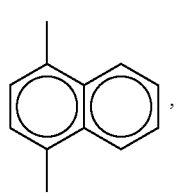

(2b)

A is an electron donating group, and
B is an electron attractive ethenyl group of formula (3a) or (3b)

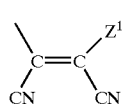

(3a)

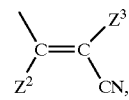

(3b)

wherein $Z^1$ is a cyano group or an ester group,
$Z^2$ is a hydrogen atom, cyano group, a halogen atom, a halogenated alkyl group, carboxyl group or an alkylcarbonyl group, and
$Z^3$ is a substituent selected from the group consisting of a halogen atom, a halogenated alkyl group, a carboxyl group, an alkylcarbonyl group and a group of formula (4), (5), (6) or (7):

(4)

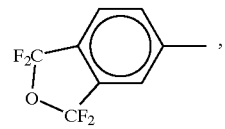

(5)

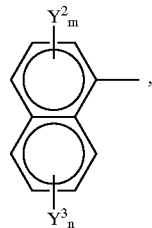

(6)

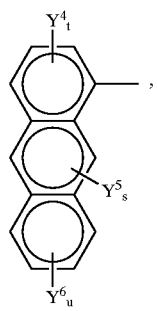

(7)

wherein $Y^1$ is a cyano group, an ester group, a halogen atom, wherein the halogen atom is a fluorine or a bromine, or a halogenated alkyl group, wherein the halogenated alkyl group is a trifluoromethyl group,
n is 1–5 and represents the number of $Y^1$ groups wherein the hydrogen atoms of the phenyl group are substituted,
Y2 and Y3 each represent a cyano group, an ester group, a halogen atom, wherein the halogen atom is fluorine or bromine, or a halogenated alkyl group, wherein the halogenated alkyl group is a trifluoromethyl group,
m is 1–3 and represents the number of $Y^2$ groups wherein the hydrogen atoms of the ring moiety of the naphthyl group bonded with the ethenyl group are substituted, h is 1–4 and represents the number of $Y^3$ groups wherein the hydrogen atoms of another ring moiety of the naphthyl group are substituted, $Y^4$, $Y^5$ and $Y^6$ each represent a cyano group, an ester group, a halogen, wherein the halogen atom is a fluorine or a bromine, or a halogenated alkyl group, wherein the halogenated alkyl group is a trifluoromethyl group, t is 1–3 and represents the number of $Y^4$ groups wherein the hydrogen atoms of the ring of the anthryl group is substituted with a hydrogen atom of formula (3a) or (3b), s is 1–2 and represents the number of $Y^5$ groups wherein the hydrogen atoms of the middle ring of the anthryl group are substituted, and u is 1 or 2 and represents the number of $Y^6$ groups wherein the hydrogen atoms of the last ring of the anthryl group are substituted.

2. The fluorescent compound according to claim 1, wherein said electron donating compound A is selected from the group consisting of an alkylamino group, amino group, an aminoaryl group, an alkylaminoaryl group, an alkoxyl group, an alkoxylaryl group, an arylakoxyl group, an alkyl group, an aryl group or a halogenated alkyl group, wherein said alkylamino group, said alkylaminoaryl group, said alkoxyl group, the alkoxyl moiety of said alkoxylaryl group, the alkoxy moiety of said arylalkoxy group, said alkyl group and said halogenated alkoxy group each have 1–20 carbon atoms, and said alkylamino group includes monoalkylamino groups and dialkylamino groups.

3. The fluorescent compound according to claim 1 wherein said electron donating compound A is an alkoxy group having 1–20 carbon atoms.

4. The fluorescent compound according to claim 1 wherein said electron donating compound A is an alkoxy group having 1–10 carbon atoms.

5. The fluorescent compound according to claim 1 wherein said electron donating compound A is an alkoxy group having 1–8 carbon atoms.

6. The fluorescent compound according to claim 1, wherein said ester group is —COOR, wherein R is an alkyl group having 1–7 carbon atoms or a phenyl group.

* * * * *